US009661645B2

United States Patent
Teng et al.

(10) Patent No.: US 9,661,645 B2
(45) Date of Patent: May 23, 2017

(54) CARRIER SELECTION AND/OR RESELECTION

(75) Inventors: Yong Teng, Beijing (CN); Yuanyong Yin, Shanghai (CN); Jun Gu, Shanghai (CN); Shuangdie Wang, Shanghai (CN); Jing Xu, Shanghai (CN); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 498 days.

(21) Appl. No.: 13/637,442

(22) PCT Filed: Mar. 26, 2010

(86) PCT No.: PCT/CN2010/000376
§ 371 (c)(1),
(2), (4) Date: Dec. 14, 2012

(87) PCT Pub. No.: WO2011/116499
PCT Pub. Date: Sep. 29, 2011

(65) Prior Publication Data
US 2013/0100835 A1    Apr. 25, 2013

(51) Int. Cl.
*H04L 12/26*    (2006.01)
*H04W 72/08*    (2009.01)
(Continued)

(52) U.S. Cl.
CPC ........... *H04W 72/085* (2013.01); *H04L 5/001* (2013.01); *H04L 5/006* (2013.01); *H04L 5/0035* (2013.01);
(Continued)

(58) Field of Classification Search
CPC ............................. H04L 5/0035; H04W 72/08
(Continued)

(56) References Cited

U.S. PATENT DOCUMENTS

2003/0040319 A1*   2/2003  Hansen et al. ............... 455/452
2006/0291401 A1*  12/2006  Yuen et al. ................... 370/252
(Continued)

FOREIGN PATENT DOCUMENTS

| CN | 1666537 A | 9/2005 |
|---|---|---|
| CN | 101124845 A | 2/2008 |
| WO | WO 2009/004442 A2 | 1/2009 |

OTHER PUBLICATIONS

3GPP TSG-RAN WG1 Meeting #60; R1-101391; CMCC; "Interference Coordination for HetNet with One or Multiple Component Carriers"; San Francisco, USA, Feb. 22-26, 2010 (3 pages).
(Continued)

*Primary Examiner* — Shaq Taha
(74) *Attorney, Agent, or Firm* — Harrington & Smith

(57) ABSTRACT

The invention relates to an apparatus including at least one processor and at least one memory including a computer program code, the at least one memory and the computer program code con-figured to, with the at least one processor, cause the apparatus at least to: search for feasible component carriers by measurements, and if at least one feasible component carrier is found, take it into use; select at least one home node for negotiations for obtaining resources, the selection being based on the measurements, and negotiate for obtaining resources, if no feasible component carriers are found; take into use at least one feasible component carrier obtained based on the negotiations, if at least one feasible component carrier is obtained; and take into use at least one component carrier which is closest feasible, if no feasible component carriers are obtained.

16 Claims, 5 Drawing Sheets

(51) Int. Cl.
  *H04L 5/00*   (2006.01)
  *H04W 48/20*  (2009.01)
  *H04W 84/04*  (2009.01)

(52) U.S. Cl.
  CPC .......... *H04L 5/0073* (2013.01); *H04L 5/0098* (2013.01); *H04W 48/20* (2013.01); *H04W 72/082* (2013.01); *H04W 84/045* (2013.01)

(58) Field of Classification Search
  USPC ........................................................ 370/252
  See application file for complete search history.

(56) References Cited

U.S. PATENT DOCUMENTS

| | | | |
|---|---|---|---|
| 2006/0292988 A1* | 12/2006 | Yuen et al. ...................... | 455/62 |
| 2009/0137241 A1* | 5/2009 | Yavuz .................. | H04W 74/04 |
| | | | 455/423 |
| 2011/0292898 A1* | 12/2011 | Wu ..................... | H04W 72/082 |
| | | | 370/329 |
| 2012/0063336 A1* | 3/2012 | Shany et al. .................. | 370/252 |
| 2014/0036845 A1* | 2/2014 | Liu ..................... | H04W 72/082 |
| | | | 370/329 |

OTHER PUBLICATIONS

3GPP TSG-RAN WG4 Meeting #51bis; R4-092400; Motorola; "Macro-cell uplink interference to HeNBs"; Los Angeles, USA, Jun. 29-Jul. 2, 2009 (6 pages).

3GPP TSG-RAN WG2 #68 bis; R2-100122; Ericsson, ST-Ericsson; „Measurements for carrier aggregation; Valencia, Spain, Jan. 18-22, 2010 (8 pages).

* cited by examiner

CARRIER SELECTION AND/OR RESELECTION

FIELD

The invention relates to apparatuses, a method, system, computer program, computer program product and computer-readable medium.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Third Generation Partnership Project (3GPP) Long Term Evolution (LTE) and Long term Evolution advanced (LTE-A) programs are to develop technology in order to provide improved spectral efficiency, reduced latency, and more efficient use of radio resources for improved user experiences and faster data transmission. As a part of these efforts, the concept of an in-home, (evolved) node B (called H(e)NB) for LTE and LTE-A networks has been introduced.

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: search for feasible component carriers by measurements, and if at least one feasible component carrier is found, take it into use; select at least one home node for negotiations for obtaining resources, the selection being based on the measurements, and negotiate for obtaining resources, if no feasible component carriers are found; take into use at least one feasible component carrier obtained based on the negotiations, if at least one feasible component carrier is obtained; and take into use at least one component carrier which is closest feasible, if no feasible component carriers are obtained.

According to another aspect of the present invention, there is provided a method searching for feasible component carriers by measurements, and if at least one feasible component carrier is found, taking it into use; if no feasible component carriers are found: selecting at least one home node for negotiations for obtaining resources, the selection being based on the measurements, negotiating for obtaining resources, if at least one feasible component carrier is obtained based on the negotiations, taking it into use, and otherwise taking into use at least one component carrier which is closest feasible.

According to yet another aspect of the present invention, there is provided a system, comprising: a plurality of different kinds of nodes, at least part of them being home nodes; the home nodes being configured to: measure interference on available component carriers; make or update at least one backup list, the backup list comprising information on feasible component carriers which are not in use; and exchange the at least one backup list with each other by messaging.

According to yet another aspect of the present invention, there is provided an apparatus comprising: means for searching for feasible component carriers by measurements, and if at least one feasible component carrier is found, take it into use; means for selecting at least one home node for negotiations for obtaining resources, the selection being based on the measurements, and negotiating for obtaining resources, if no feasible component carriers are found; means for taking into use at least one feasible component carrier obtained based on the negotiations, if at least one feasible component carrier is obtained; and means for taking into use at least one component carrier which is closest feasible, if no feasible component carriers are obtained.

According to yet another aspect of the present invention, there is provided computer program product embodied on a computer readable medium, the computer program being configured to control a processor to perform: searching for feasible component carriers by measurements, and if at least one feasible component carrier is found, taking it into use; if no feasible component carriers are found: selecting at least one home node for negotiations for obtaining resources, the selection being based on the measurements, negotiating for obtaining resources, if at least one feasible component carrier is obtained based on the negotiations, taking it into use, and otherwise taking into use at least one component carrier which is closest feasible.

According to yet another aspect of the present invention, there is provided computer-readable medium encoded with instructions that, when executed by a computer, perform: searching for feasible component carriers by measurements, and if at least one feasible component carrier is found, taking it into use; if no feasible component carriers are found: selecting at least one home node for negotiations for obtaining resources, the selection being based on the measurements, negotiating for obtaining resources, if at least one feasible component carrier is obtained based on the negotiations, taking it into use, and otherwise taking into use at least one component carrier which is closest feasible.

LIST OF DRAWINGS

Embodiments of the present invention are described below, by way of example only, with reference to the accompanying drawings, in which FIG. 1 illustrates an example of a system;

DESCRIPTION OF EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user device, such as a user terminal, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different embodiments will be described using, as an example of an access architecture to which the embodiments may be applied, a radio access architecture based on LTE Advanced, LTE-A, that is based on orthogonal frequency multiplexed access (OFDMA) in a downlink and a single-carrier frequency-division multiple access (SC-FDMA) in an uplink, without restricting the embodiments to such an architecture, however.

In an orthogonal frequency division multiplexing (OFDM) system, the available spectrum is divided into multiple orthogonal sub-carriers. In OFDM systems, available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

Typically, a (e)NodeB needs to know channel quality of each user device and/or the preferred precoding matrices (and/or other multiple input-multiple output (MIMO) specific feedback information, such as channel quantization) over the allocated sub-bands to schedule transmissions to user devices. Required information is usually signalled to the (e)NodeB.

Figure 1:
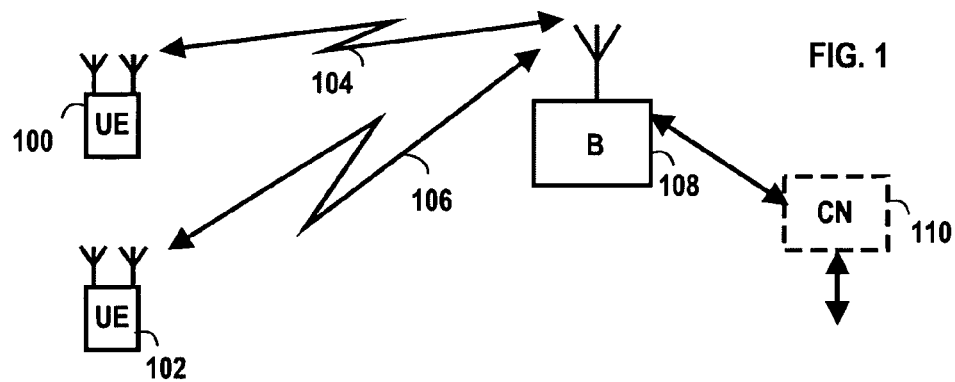

FIG. 1 is an example of a simplified system architecture only showing some elements and functional entities, all being logical units whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with the necessary properties.

FIG. 1 shows a part of a radio access network of E-UTRA, LTE or LTE-Advanced (LTE-A). E-UTRA is an air interface of Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

FIG. 1 shows user devices 100 and 102 configured to be in a wireless connection on one or more communication channels 104, 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of communication system it is coupled to. The (e)NodeB may also be referred to a base station, an access point or any other type of interfacing device including a relay station capable of operating in a wireless environment.

The (e)NodeB includes transceivers, for instance. From the transceivers of the (e)NodeB, a connection is provided to an antenna unit that establishes bi-directional radio links to the user devices. The (e)NodeB is further connected to a core network 110 (CN). Depending on the system, the counterpart on the CN side can be a serving system architecture evolution (SAE) gateway (routing and forwarding user data packets), packet data network gateway (PDN GW), for providing connectivity to user devices (UEs) to external packet data networks, or mobile management entity (MME), etc. The communication system is also able to communicate with other networks, such as a public switched telephone network or the Internet.

The user device (also called UE, user equipment, user terminal, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, laptop computer, game console, notebook, and multimedia device.

The user device (or a layer 3 relay node) is configured to perform one or more of user equipment functionalities described below with an embodiment, and it may be configured to perform functionalities from different embodiments. The user device may also be called a subscriber unit, mobile station, remote terminal, access terminal, user terminal or user equipment (UE) just to mention but a few names or apparatuses.

It should be understood that, in the FIG. 1, user devices are depicted to include 2 antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements. At least one of the NodeBs or eNodeBs may be a Home (e) nodeB. The concept of Home (e) nodeB is explained in further detail below.

Typically, in a geographical area of a radio communication system there is provided a plurality of different kinds of radio cells as well as a plurality of radio cells as also shown in FIG. 1. Radio cells may be macro cells (or umbrella cells) which are large cells, usually having a diameter of up to tens of kilometers, or smaller cells such as micro- or picocells. A cellular radio system may be implemented as a multilayer network including several kinds of cells, such as macro-, micro- and picocells.

Recently for fulfilling the need for improving the deployment and performance of communication systems, concept of "plug-and-play" node (e) Bs has been introduced. Typically, a network which is able to use "plug-and-play" node (e)Bs, includes, in addition to Home node (e)Bs (Home (e) nodeBs), a home node B gateway, or HNB-GW. A HNB Gateway (HNB-GW), which is typically installed within an operator's network aggregates traffic from a large number of HNBs back to a core network through Iu-cs and Iu-ps interfaces.

Term "plug-and-play" is used herein to describe an apparatus which can be coupled to a network with a minimum configuration work, typically such an apparatus is a self-configuring device. For enabling "plug-and-play" devices a self-organizing network (SON) and flexible spectrum use (FSU) concepts have been launched. The SON concept is for instance known in connection to computer networks and neural networks. The FSU enables devices to use spectrum in a flexible manner. In future networks, more frequency bands will be needed for new high-bit-rate wireless services.

A home node (e)B (sometimes being comparable to a femto or pico node) when coupled to broadband services providing an umbrella cell provides radio coverage for user devices. H(e)NBs may provide the capabilities of a standard node B as well as the radio resource management functions of a standard radio network controller (RNC).

A HN (e)B when serving as a "plug-and-play" node B may be a wireless access point purchased, installed and operated by a private user, a single user or a community, such as a university or a shopping centre. Thus, the exact location of a H(e)NB under the umbrella cell (or macro cell) when the H(e)BN is wirelessly coupled to a network may not be known or it is of uncoordinated random nature which causes problems in network configuration.

A home node B may be used in a local area network (LAN) which is a computer network covering a relatively small geographical area, such as a home or office. Similar kinds of networks are personal area networks (PANs), campus area networks (CANs), or metropolitan area networks (MANs).

Another network system where HNBs are typically used is a Wide Area Network (WAN) which is a network covering a relatively broad area. A WAN may be defined to be a network whose coverage crosses metropolitan, regional, or national boundaries. Probably the best-known example is the Internet.

An example of a network system is also a mixed Local Area/Wide Area (LA/WA) scenario in which several cellular networks of the same radio access technology (e.g. E-UTRA) being operated by different operators are deployed in the same geographical area, such as a modern home-and-office building complex, and are using the same radio spectrum resources.

The mixed LA/WA scenarios may for instance refer to hierarchical cell structures, such as to a LTE/LTE or LTE/LTE-A co-existence or hot spots with overlay network. Within LA/WA coverage, H(e)NBs or local node Bs (LNBs) of the same or different networks may be placed and set up next to each other in a short distance in a spatially uncoordinated fashion.

In the following, an embodiment of a method for is explained in further detail. The embodiment starts in block 200.

When a new Home (e)NodeB (H(e)NB) is powered on, one or more component carriers should be selected by the H(e)NB for operation. It may occur that the new H(e)NB is confronted with high interference on all available component carriers leading to a situation that no feasible component carriers are provided. A feasible component carrier may herein mean a component carrier which is available and usable for communication. Thus, a need exists to adapt spectrum usage to variations in network topology.

An embodiment for carrier selection/reselection may be shortly characterized in such a manner that when a new H(e)NodeB is powered-on, the H(e)NodeB defines feasible component carriers based for instance on interference measurements. Among the feasible component carriers the H(e)NodeB chooses one component carrier to active use which is included into its active component carrier list and the other feasible component carries are put into its backup component carrier list. The backup component carrier list is used for newly powered-on H(e)NodeB if it has not any feasible component carriers available.

Figure 2:
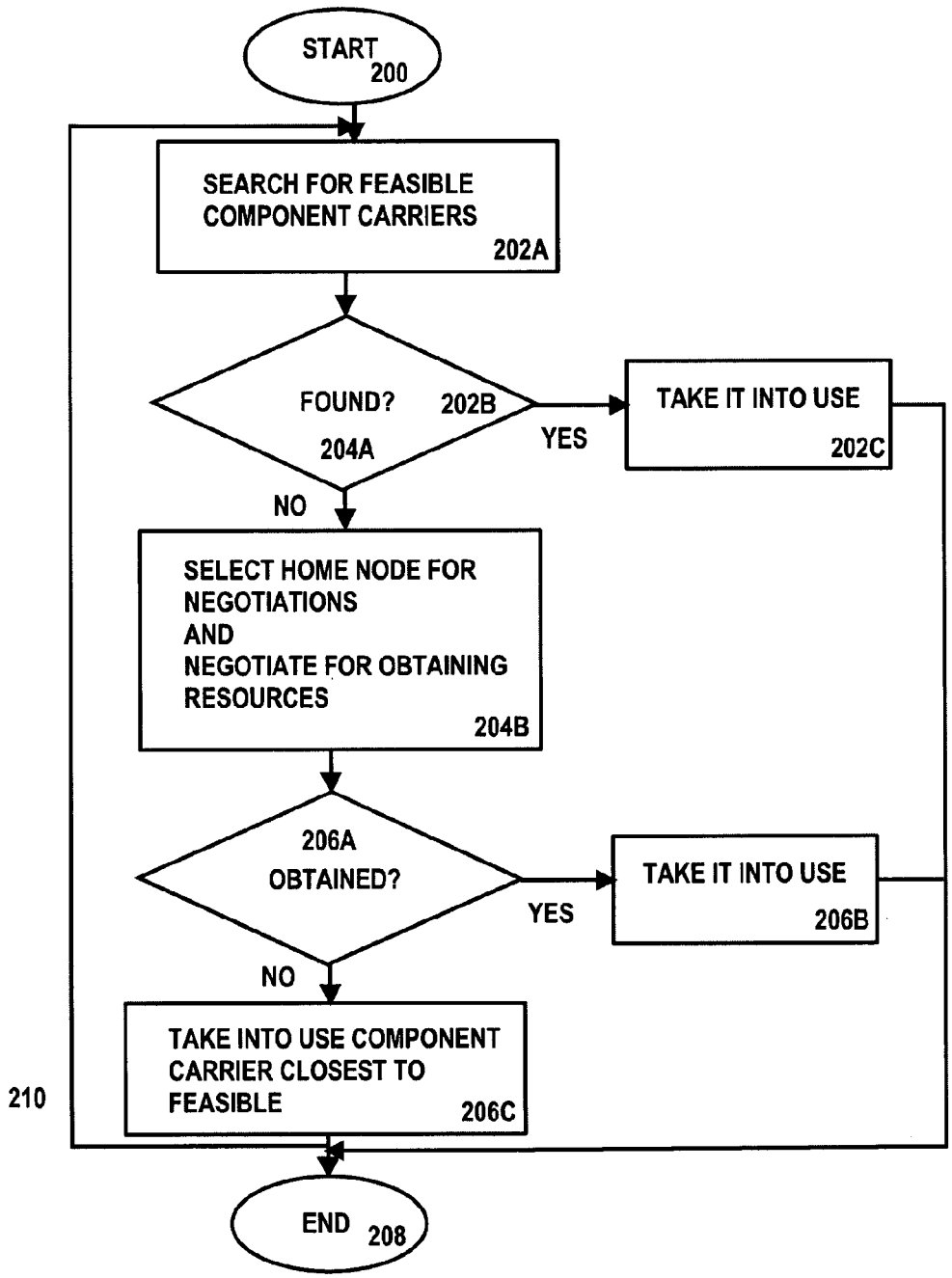
FIG. 2 is a flow chart.

In block 202, searching for feasible component carriers by measurements, and if at least one feasible component carrier is found, it is taken into use (FIG. 2, 202A, 202B, 202C).

After switching on and synchronization, a new H(e)NodeB measures interference on selected component carriers. If the new H(e)NodeB finds at least one component carrier whose interference is acceptable, such as below a set threshold according to Quality of Service requirement, the at least one component carrier is defined as a feasible component carrier. If more than one feasible component carriers exist, one of them is taken into use, and the others are included into a backup list. Thus a backup list comprises information on feasible component carriers which are not in use, in other words they are not active. Further, the backup list may comprise information on one or more mapping relationships between the one or more feasible component carriers which are not in use and one or more feasible component carriers which are in use. This is useful in multi-carrier cases, where at least one of neighbouring H(e)NB are using more than one component carriers that may correspond to different component carriers on the backup list. H(e)NodeBs may exchange backup lists.

In block 204, if no feasible component carriers are found, at least one home node is selected for negotiations for obtaining resources, the selection being based on the measurements, and negotiations for obtaining resources are carried out (FIG. 2, 204A, 204B).

In this case, the new H(e)NodeB finds by carrying out interference measurements, that no feasible component carriers are provided. Then, the new H(e)NodeB starts negotiating with at least one of the neighbouring H(e)NodeBs based on received backup lists.

In block 206, if at least one feasible component carrier is obtained based on the negotiations, it is taken into use, otherwise at least one component carrier which is closest feasible is taken into use (FIG. 2, 206A, 206B, 206C).

The negotiations may comprise the following procedure: the new H(e)NodeB realises that one or more of the neighbouring H(e)NodeBs have a component carrier on its backup list which may be released through component carrier reselection and that component carrier may be feasible for the new H(e)NodeB. The new H(e)NodeB transmits a component carrier reselection request to that H(e)NodeB (one or more) to change the active (in use) component carrier to one of the component carriers on the backup list. After receiving a message that the active component carrier has been changed, the new H(e)NodeB may measure interference on now feasible component carrier again as a further check and choose it into use. The new H(e)NodeB fulfils its backup list with a feasible component carrier, if one exists, or otherwise sets it to zero. The other H(e)NodeBs who have participated to the negotiations may also update their backup lists based on messaging.

The negotiations may comprise at least one of: exchanging backup lists, transmitting a component carrier reselection request for causing a change of a feasible component carrier in use to one of component carriers on a backup list, and receiving a message of releasing the desired component carrier.

If no feasible component carriers are to be released, that is the backup lists are empty or the component carriers on the list are not feasible, the new H(e)NodeB chooses the most suitable component carrier, that is for instance a component carrier whose interference is the smallest. After that, the new H(e)NodeB sets its backup component carrier list to be zero.

It should be appreciated that backup lists and/or mapping information may be updated as a part of carrier selection/reselection in appropriate phases.

The embodiment ends in block 208. The embodiment is repeatable and one option for repetition is shown with arrow 210.

Next, an example further clarifying the procedure is explained by means of FIGS. 3A, 3B, 4A and 4B. The example is simplified and only used for clarification purposes, and it does not limit the implementation of embodiments by any means.

Figure 3A:
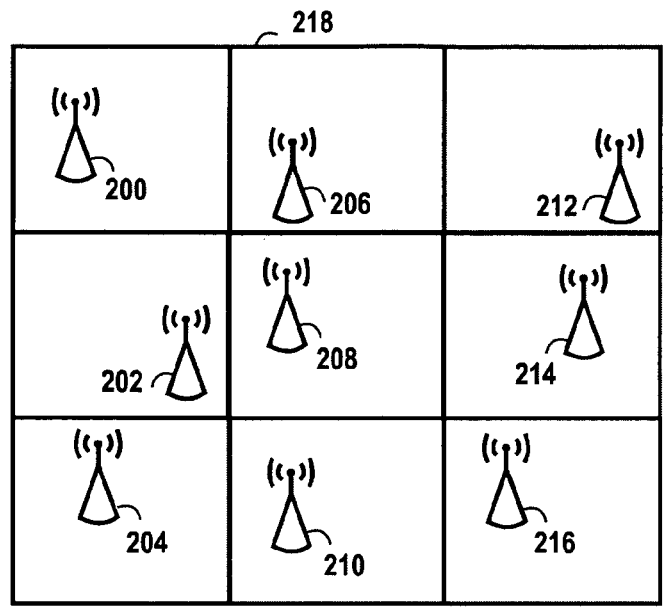
FIGS. 3A and 3B show an example of component carrier allocation.

FIG. 3A illustrates a layout 218 of Home(e)NodeBs 200, 202, 204, 206, 208, 210, 212, 214, 216. The layout depicts an imaginary office having 9 rooms each having one H(e)NodeB. Only two component carriers CC1 and CC2 are provided and each of the H(e)NodeBs choose one component carrier for use. It should be appreciated that some or all of the H(e)NodeBs may also choose more than one component carrier for use. The H(e)NodeBs are powered on in the following order: 204, 216, 210, 202, 206, 208, 214, 200, 212.

First the case when at least one feasible component carrier (CC) is found.

H(e)NodeB 204 measures interference on CC1 and CC2, and finds out that them both are feasible. It is assumed that the H(e)NodeB 204 chooses CC1 as its active component carrier and puts CC2 on its backup list. Hence, the backup list looks as follows:

TABLE 1

| | Active (chosen) CC | Backup CC |
| --- | --- | --- |
| H (e) NB 204 | CC1 | CC2 |

H(e)NodeB 216 chooses CC2 as an active component carrier and CC1 on its backup list. After that, the backup list looks as follows:

TABLE 2

| | Active (chosen) CC | Backup CC |
| --- | --- | --- |
| H (e) NB 216 | CC2 | CC1 |

Figure 4A:
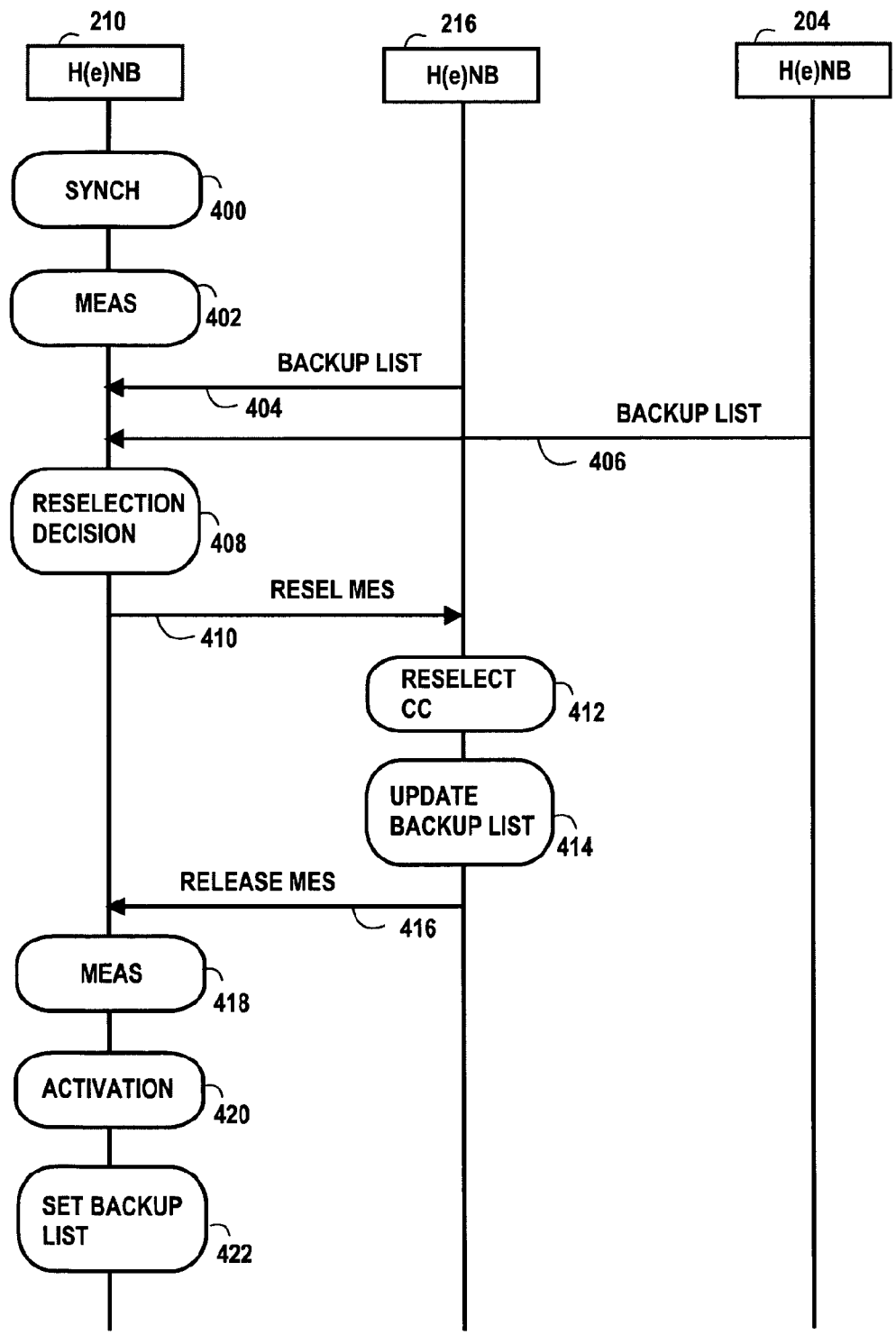
FIGS. 4A and 4B show examples of messaging.

Next, the case when no feasible component carriers can be found but one component carrier may be released, is explained. Messaging between H(e)NodeBs in the example are shown in FIG. 4A.

After power switch-on H(e)NodeB 210 carries out synchronization with other H(e)NodeBs 400 and measures interference on different component carriers 402. For H(e)NodeB 210 no feasible component carriers exists due to interference. But, according to backup lists received from H(e)NodeB 216 and H(e)NodeB 204 (messages 404 and 406), one component carried used by another H(e)NodeB may be released by component carrier reselection and the released component carrier may be feasible for the H(e)NodeB 210: if H(e)NodeB 216 reselected the CC1 as its active CC, the CC2 could be used by the H(e)NodeB 210 and the interference between H(e)NodeB 204, H(e)NodeB 216 and H(e)NodeB 210 could be mitigated. Thus the H(e)NodeB 210 decides the best option to be that the H(e)NodeB 216 reselects its component carrier 408. Then the H(e)NodeB 210 transmits 410 a carrier reselection request to the H(e)NodeB 216. After receiving the request from the H(e)NodeB 210, the H(e)NodeB 216, reselects the CC1 as its active component carrier 412, and deletes the CC1 from its backup list 414.

The H(e)NodeB 216 informs the H(e)nodeB 210 that the CC2 has been released 416. The H(e)NodeB 210 measures interference on the CC2 418 and chooses the CC2 as its active component carrier 420 and set its backup list to zero 422.

The H(e)NodeB 204 also measures interference on the CC2 and deletes the CC2 from its backup list.

The backup lists are as follows:

TABLES 3

| | Active (chosen) CC | Backup CC |
| --- | --- | --- |
| H (e) NB 204 | CC1 | 0 |
| H (e) NB 210 | CC2 | 0 |
| H (e) NB 216 | CC1 | 0 |

Figure 4B:
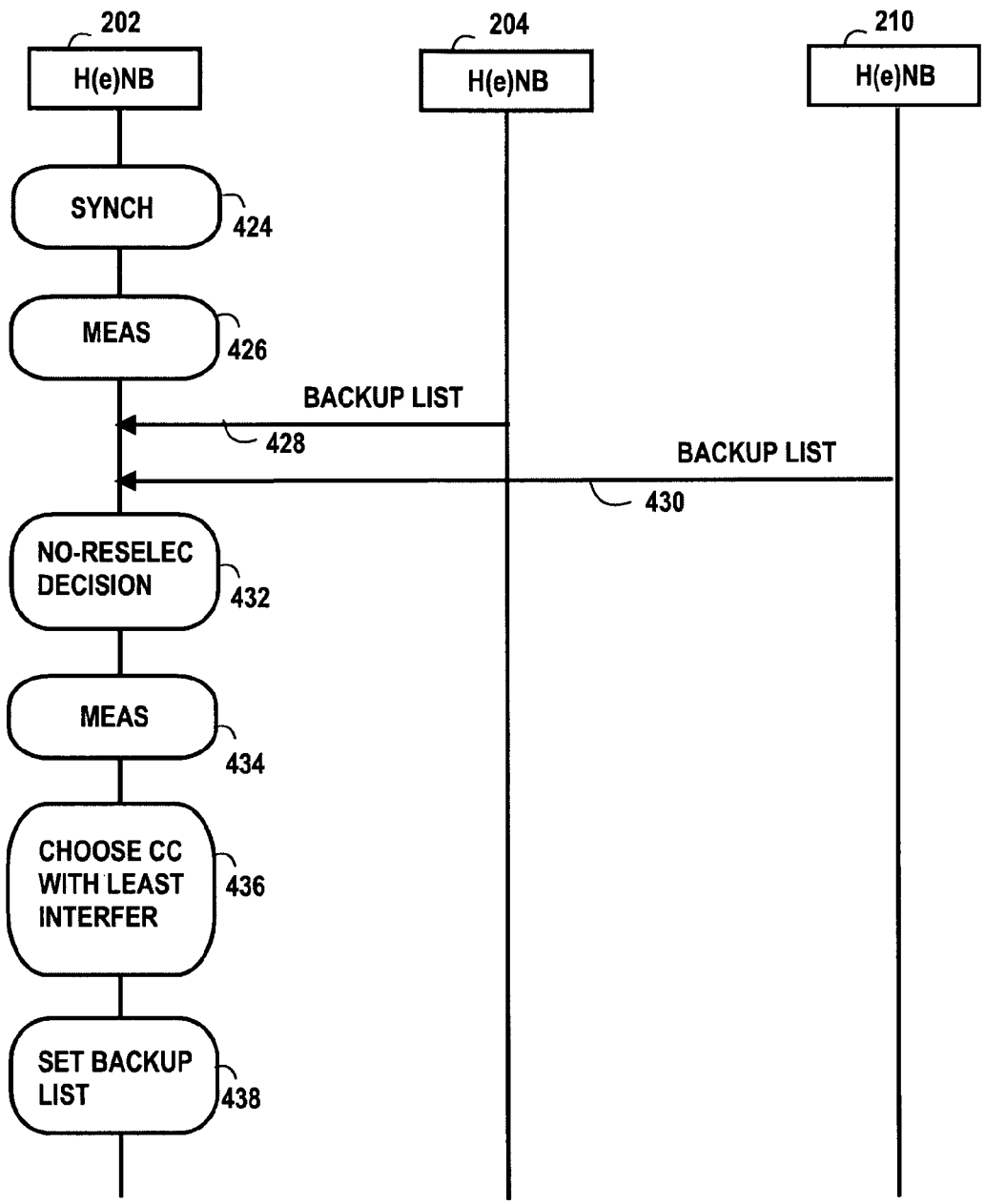

Next, the case when no feasible component carriers can be found and no feasible component carrier can be released is explained. Messaging between H(e)NodeBs in the example are shown in FIG. 4B.

After power switch-on H(e)NodeB 202 carries out synchronization with other H(e)NodeBs 424 and measures interference on different component carriers 426. For H(e)NodeB 202 no feasible component carriers exists due to interference. The H(e)NodeB 202 receives backup lists from H(e)NodeB 204 and H(e)NodeB 210 (messages 428 and 430). As can be seen in Tables 3, these backup lists are empty. Thus, no feasible component carrier to be released is provided. Hence the H(e)NodeB 202 decides not to transmit a carrier reselection request 432. The H(e)NodeB 202 measures interference on CC1 and CC2 434 and chooses the component carrier having lowest interference as its active component carrier 436 and sets its backup list to zero 438.

The procedures described above are applied to the appropriate extent every time a new H(e)NodeB is switched on. In this example, all the 9 H(e)NodeBs join the network, and the backup lists look as follows:

TABLES 4

| | Active (chosen) CC | Backup CC |
| --- | --- | --- |
| H (e) NB 200 | CC1 | |
| H (e) NB 202 | CC2 | |
| H (e) NB 204 | CC1 | |
| H (e) NB 206 | CC1 | |
| H (e) NB 208 | CC2 | |
| H (e) NB 210 | CC2 | |
| H (e) NB 212 | CC2 | |
| H (e) NB 214 | CC1 | 0 |
| H (e) NB 216 | CC1 | 0 |

It should be appreciated that an empty backup list means the same as a backup list wherein zero is written.

Figure 3B:
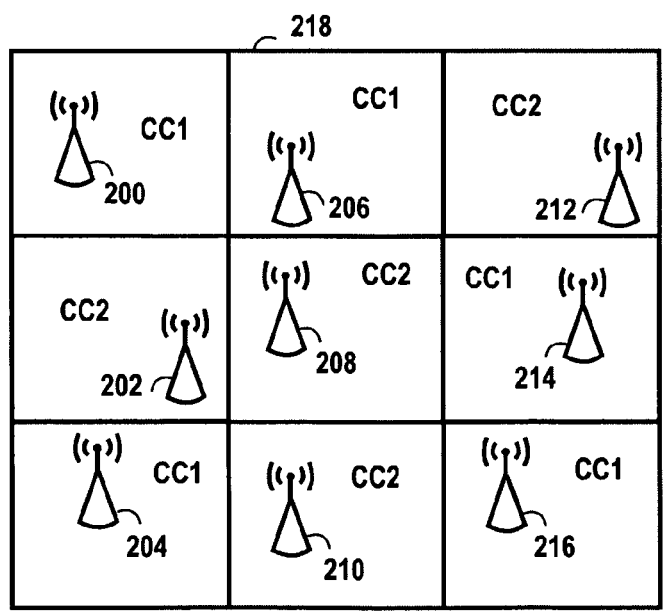

FIG. 3B illustrates the situation also shown in Tables 4, wherein all the H(e)NodeBs of the imaginary office having 9 rooms each having one H(e)NodeB are switched on. All the H(e)NodeBs have one component carrier in use.

The steps/points, signaling messages and related functions described above in FIGS. 2, 3A, 3B, 4A and 4B are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

It should be understood that transmitting and/or receiving may herein mean preparing a transmission and/or reception, preparing a message to be transmitted and/or received, or physical transmission and/or reception itself, etc on a case by case basis.

In the following, an example of a communication system, wherein component carrier resources may be shared, is explained in more detail. The system is based on a part of a communication system described in FIG. 1.

In the system, a plurality of different kinds of nodes are provided, at least part of them being H(e)NodeBs. After power switch-on, each of H(e)NodeB measures interference on available component carriers and makes or updates its backup list. The H(e)NodeBs exchange their backup lists with each other by messaging. This enables component carrier reselection when needed.

An embodiment provides an apparatus which may be any node, host, user device or any other suitable apparatus able to carry out processes described above in relation to FIG. 2.

Figure 5:
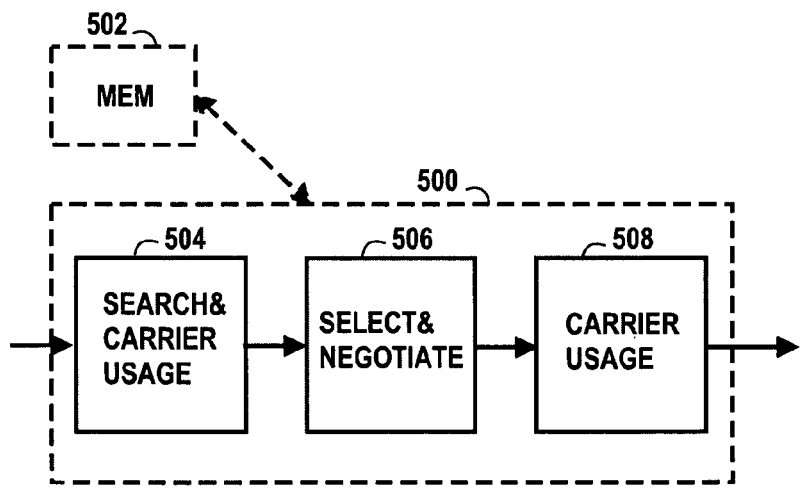
FIG. 5 illustrates examples of an apparatus.

FIG. 5 illustrates a simplified block diagram of an apparatus according to an embodiment especially suitable for component carrier selection and/or reselection. It should be appreciated that the apparatus may also include other units or parts than those depicted in FIG. 5. Although the apparatus has been depicted as one entity, different modules and memory may be implemented in one or more physical or logical entities.

The apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus.

The apparatus may be a software application, or a module, or a unit configured as arithmetic operation, or as a program (including an added or updated software routine), executed by an operation processor. Programs, also called program products or computer programs, including software routines, applets and macros, can be stored in any apparatus-readable data storage medium and they include program instructions to perform particular tasks. Computer programs may be coded by a programming language, which may be a high-level programming language, such as C, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

As an example of an apparatus according to an embodiment, it is shown an apparatus, such as a node device, including facilities in a control unit 500 (including one or more processors, for example) to carry out functions of embodiments, such as negotiations between node devices for obtaining resources. This is depicted in FIG. 5. Another example of an apparatus may include at least one processor 500 and at least one memory 502 including a computer program code, the at least one memory and the computer program code configured to, with the at least one processor, cause the apparatus at least to: search for feasible component carriers by measurements, and if at least one feasible component carrier is found, take it into use, select at least one home node for negotiations for obtaining resources, the selection being based on the measurements, and negotiate for obtaining resources, if no feasible component carriers are found, take into use at least one feasible component carrier obtained based on the negotiations, if at least one feasible component carrier is obtained, and take into use at least one component carrier which is closest feasible, if no feasible component carriers are obtained.

Yet another example of an apparatus comprises means (504) for searching for feasible component carriers by measurements, and if at least one feasible component carrier is found, take it into use, means (506) for selecting at least one home node for negotiations for obtaining resources, the selection being based on the measurements, and negotiating for obtaining resources, if no feasible component carriers are found, means (508) for taking into use at least one feasible component carrier obtained based on the negotiations, if at least one feasible component carrier is obtained, and means (508) for taking into use at least one component carrier which is closest feasible, if no feasible component carriers are obtained. Yet another example of an apparatus comprises a searcher (504) configured to search for feasible component carriers by measurements, and if at least one feasible component carrier is found, take it into use, a selector (506) configured to select at least one home node for negotiations for obtaining resources, the selection being based on the measurements, and negotiate for obtaining resources, if no feasible component carriers are found, a first controller (508) configured to take into use at least one feasible component carrier obtained based on the negotiations, if at least one feasible component carrier is obtained, and a second controller (510) configured to take into use at least one component carrier which is closest feasible, if no feasible component carriers are obtained.

It should be appreciated that different units may be implemented as one module, unit, processor, etc, or as a combination of several modules, units, processor, etc.

It should also be appreciated that the first controller and the second controller may be different units or included into a same unit, for example by means of separate but cooperatively executable program codes or they may be parts of the same program code.

It should be understood that the apparatuses may include other units or modules etc. used in or for transmission. However, they are irrelevant to the embodiments and therefore they need not to be discussed in more detail herein.

Transmitting may herein mean transmitting via antennas to a radio path, carrying out preparations for physical transmissions or transmission control depending on the implementation, etc. The apparatus may utilize a transmitter and/or receiver which are not included in the apparatus itself, such as a processor, but are available to it, being operably coupled to the apparatus.

An embodiment provides a computer program embodied on a distribution medium, comprising program instructions which, when loaded into an electronic apparatus, constitute the apparatus as explained above.

Another embodiment provides a computer program embodied on a computer readable medium, configured to control a processor to perform embodiments of the method described above.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
   at least one processor and at least one memory including a computer program code, the at least one memory and the computer program code configured to, with the at least one processor, cause the apparatus at least to:
   search for feasible component carriers by measuring interference on selected component carriers, and in response to finding at least one feasible component carrier whose interference is below a set threshold according to Quality of Service requirements, take it into use;
   in response to finding more than one feasible component carrier, take one of the feasible component carriers into use and include the others into a backup list;
   select at least one home node for carrying out negotiations for obtaining at least one feasible component carrier, the selection being based on the measurements, and carry out negotiations between the selected node and a neighboring home node for obtaining at least one feasible component carrier, in response to failure to find any feasible component carriers in the search, wherein negotiations for obtaining at least one feasible component carrier comprise a request to release a feasible component carrier currently in use so as to make that component carrier available for the at least one home node;
   in response to obtaining at least one feasible component carrier based on the negotiations, take into use the at least one feasible component carrier; and
   in response to failure to obtain any feasible component carriers, take into use the component carrier experiencing the lowest interference.

2. The apparatus of claim 1, further caused to:
   receive a backup list from at least one home node comprising information on at least one of: one or more feasible component carriers which are not in use, and one or more mapping relationships between the one or more feasible component carriers which are not in use and one or more feasible component carriers which are in use.

3. The apparatus of claim 1, further caused to:
   find on the received at least one backup list a component carrier which is feasible if released from use;
   transmit to the at least one home node a component carrier reselection request to change the component carrier in use to one of component carriers on the at least one backup list, and receive a message on the component carrier change.

4. The apparatus of claim 1, further caused to: measure interference on the feasible component carrier; and
   take the feasible component carrier into use.

5. The apparatus of claim 1, further caused to:
   update a backup list with information on at least one of the following: one or more feasible component carriers which are not in use, and one or more mapping relationships between the one or more feasible component carriers which are not in use and one or more feasible component carriers which are in use.

6. The apparatus of claim 1, the apparatus comprising a node device.

7. A method comprising:
   searching for feasible component carriers by measuring interference on selected component carriers, and in response to finding at least one feasible component carrier whose interference is below a set threshold according to Quality of Service requirements, taking it into use;
   in response to finding more than one feasible component carrier, taking one of the feasible component carriers into use and including the others into a backup list;
   in response to failure to find any feasible component carriers:
   selecting at least one home node for negotiations for obtaining at least one feasible component carrier, the selection being based on the measurements, carrying out negotiations between the selected home node and a neighboring home node for obtaining at least one feasible component carrier, in response to failure to find any feasible component carriers in the search, wherein negotiations for obtaining at least one feasible component carrier comprise a request to release a feasible component carrier currently in use so as to make that component carrier available for the at least one home node, in response to obtaining at least one feasible component carrier based on the negotiations, taking into use the at least one feasible component carrier, and in response to failure to obtain any feasible component carriers, taking into use the component carrier experiencing the lowest interference.

8. The method of claim 7, further comprising:
receiving a backup list from at least one home node comprising information on at least one of: one or more feasible component carriers which are not in use, and one or more mapping relationships between the one or more feasible component carriers which are not in use and one or more feasible component carriers which are in use.

9. The method of claim 7, further comprising:
finding on the received at least one backup list a component carrier which is feasible if released from use;
transmitting to the at least one home node a component carrier reselection request to change the component carrier in use to one of component carriers on the at least one backup list, and receiving a message on component carrier change.

10. The method of claim 7, further comprising: measuring interference on the feasible component carrier; and
taking the feasible component carrier into use.

11. The method of claim 7, further comprising:
updating a backup list with information on at least one of: one or more feasible component carriers which are not in use, and one or more mapping relationships between the one or more feasible component carriers which are not in use and one or more feasible component carriers which are in use.

12. An apparatus comprising:
means for searching for feasible component carriers by measuring interference on selected component carriers, and in response to finding at least one feasible component carrier whose interference is below a set threshold according to Quality of Service requirements, taking it into use;

means for, in response to finding more than one feasible component carrier, taking one of the feasible component carriers into use and include the others into a backup list;

means for selecting at least one home node for negotiations for obtaining at least one feasible component carrier, the selection being based on the measurements, and carrying out negotiations between the selected node and a neighboring home node for obtaining at least one feasible component carrier, in response to failure to find any feasible component carriers in the search, wherein negotiations for obtaining at least one feasible component carrier comprise a request to release a feasible component carrier currently in use so as to make that component carrier available for the at least one home node;

means for, in response to obtaining at least one feasible component carrier based on the negotiations, taking into use the at least one feasible component carrier; and means for, in response to failure to obtain any feasible component carriers, taking into use at least one component carrier experiencing the lowest interference.

13. A non-transitory computer readable medium storing a program of instructions, execution of which by at least one processor configures an apparatus to perform at least:

searching for feasible component carriers by measuring interference on selected component carriers, and in response to finding at least one feasible component carrier whose interference is below a set threshold according to Quality of Service requirements, taking it into use;

in response to finding more than one feasible component carrier, take one of the feasible component carriers into use and including the others into a backup list;

in response to failure to find any feasible component carriers:

selecting at least one home node for negotiations for obtaining at least one feasible component carrier, the selection being based on the measurements, carrying out negotiations between the selected node and a neighboring home node for obtaining at least one feasible component carrier in the search, wherein negotiations for obtaining at least one feasible component carrier comprise a request to release a feasible component carrier currently in use so as to make that component carrier available for the at least one home node, in response to obtaining at least one feasible component carrier based on the negotiations, taking into use the at least one feasible component carrier, and in response to failure to obtain any feasible component carriers, taking into use at least one component carrier experiencing the lowest interference.

14. The non-transitory computer readable medium of claim 13, wherein the apparatus is further configured to perform:

receiving a backup list from at least one home node comprising information on at least one of: one or more feasible component carriers which are not in use, and one or more mapping relationships between the one or more feasible component carriers which are not in use and one or more feasible component carriers which are in use.

15. The non-transitory computer readable medium of claim 13, wherein the apparatus is further configured to perform:

updating a backup list with information on at least one of: one ore more feasible component carriers which are not in use, and one or more mapping relationships between the one or more feasible component carriers which are not in use and one or more feasible component carriers which are in use.

16. The non-transitory computer readable medium of claim 13, wherein the apparatus is further configured to perform: finding on the received at least one backup list a component carrier which is feasible if released from use;

transmitting to the at least one home node a component carrier reselection request to change the component carrier in use to one of component carriers on the at least one backup list, and receiving a message on component carrier change.

* * * * *